Nov. 25, 1947.  W. B. ELLWOOD  2,431,319
MAGNETIC FIRING DEVICE
Filed Feb. 9, 1943  3 Sheets-Sheet 1
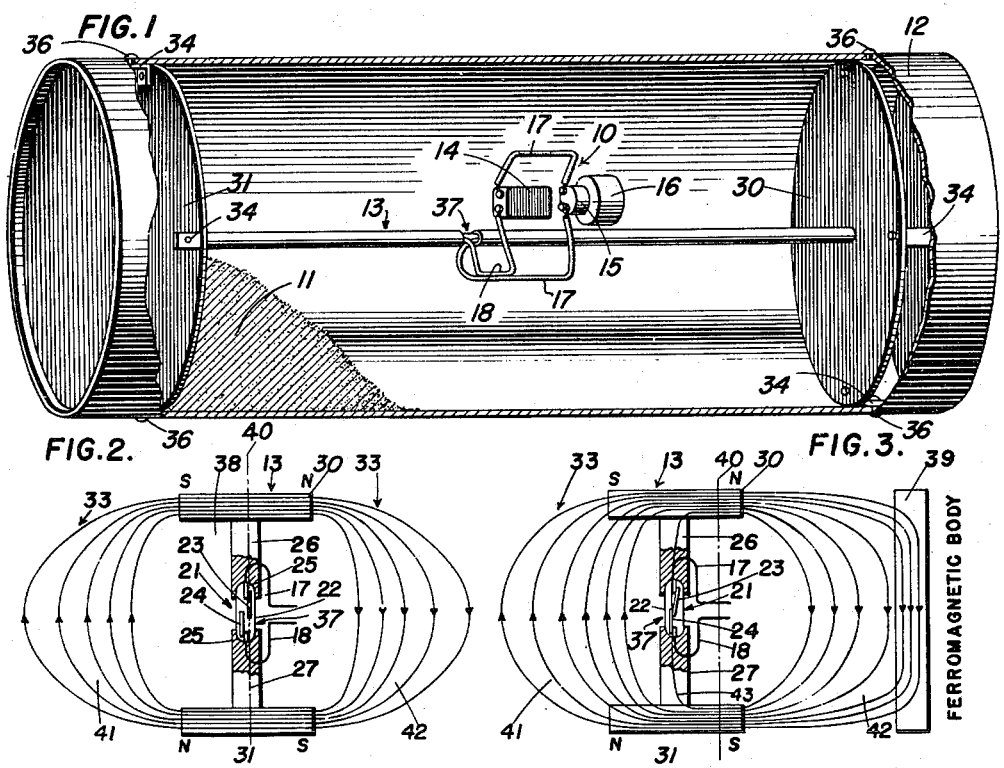
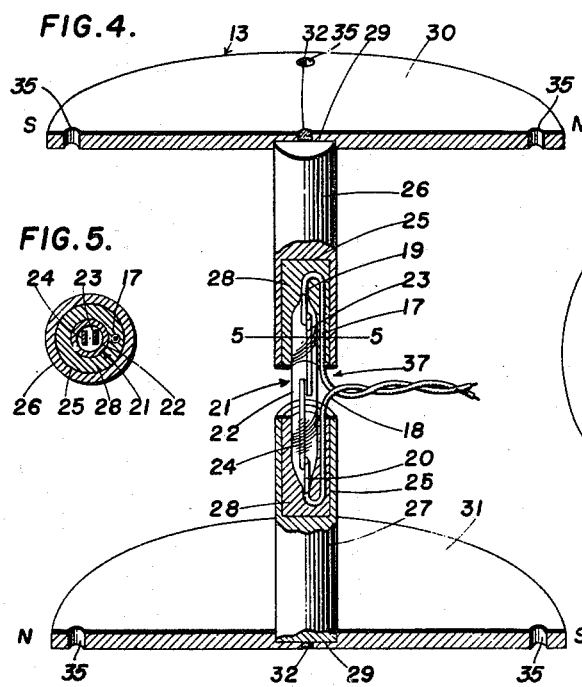
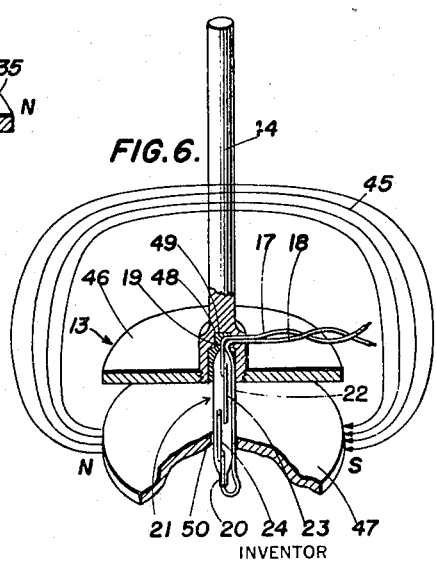
INVENTOR
WALTER B. ELLWOOD.
BY
ATTORNEY

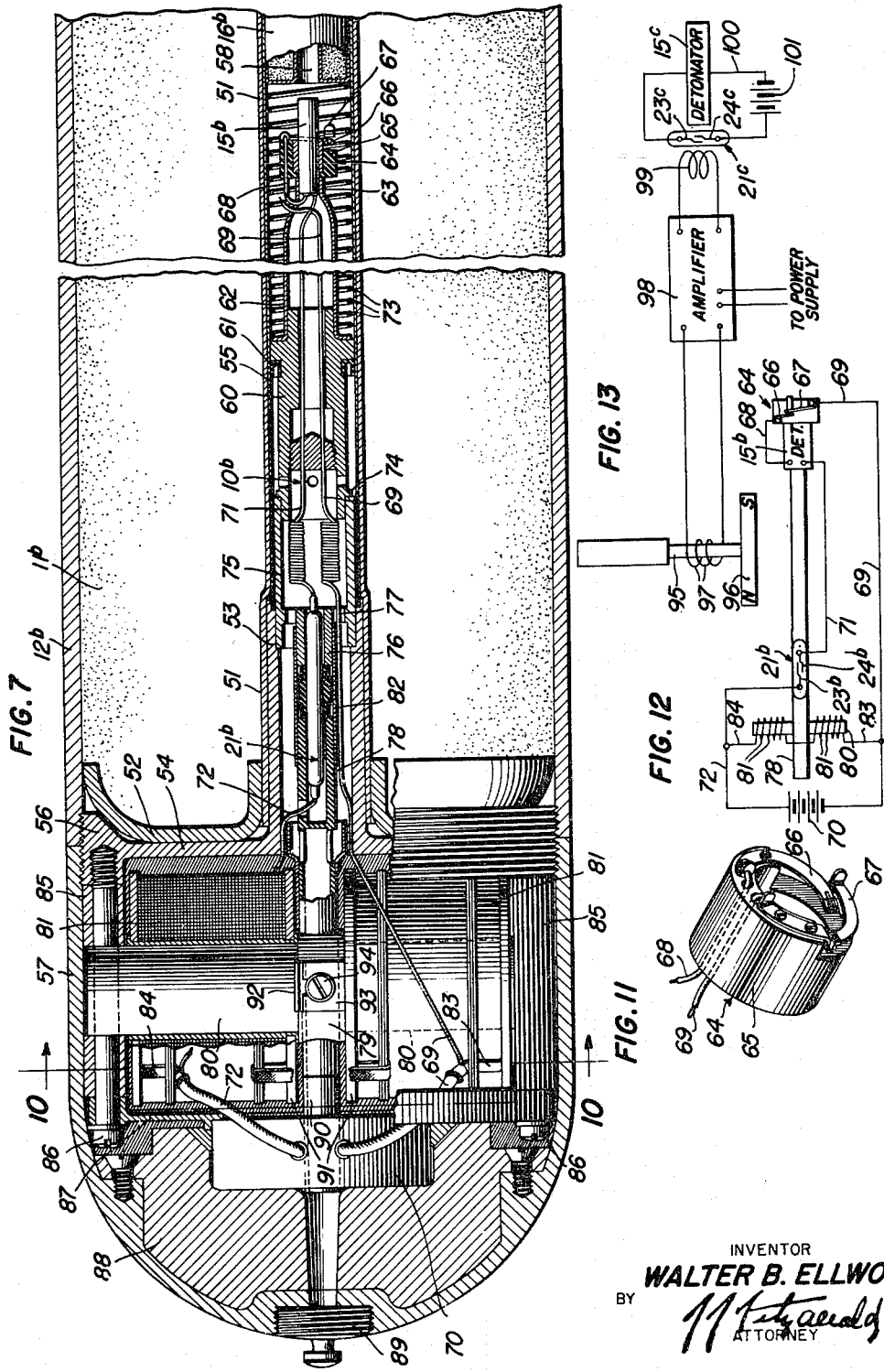

Nov. 25, 1947.　　　W. B. ELLWOOD　　　2,431,319
MAGNETIC FIRING DEVICE
Filed Feb. 9, 1943　　　3 Sheets-Sheet 3

INVENTOR
WALTER B. ELLWOOD
BY
ATTORNEY

UNITED STATES PATENT OFFICE 2,431,319

MAGNETIC FIRING DEVICE

Walter B. Ellwood, New York, N. Y.

Application February 9, 1943, Serial No. 475,269

6 Claims. (Cl. 102—7)

(Granted under the act of March 3, 1883, as amended April 30, 1928; 370 O. G. 757)

This invention relates to improvements in firing mechanisms such as are used, in the example herein chosen, for the firing of bombs or equivalent explosive charges. The instant firing mechanism, however, is distinguished from others of this kind by eliminating the need of both physical contact with the target and/or a depth or time-regulated control for accomplishing the detonation.

The device may also be used as a magnetic switch for the closure of an electrical circuit not necessarily identified with a firing mechanism. This is intended to embrace purposes such as the closure of an electrical circuit as a result of the influence of magnetic forces. But in order to disclose an example of one use of the device, the drawings show the invention in a bomb or equivalent explosive charge.

A characteristic of the invention as it relates to an explosive charge is that its operativeness is limited to targets of ferromagnetic character. Substances are defined herein as ferromagnetic when they exhibit magnetic effects similar to those shown by iron, nickel, cobalt and their alloys. In this respect it embodies the quality of becoming active only when a change is effected in its surrounding magnetic field by the presence of a target of that character. Said field, according to the requirements of the invention, is normally of an initially symmetrical and undistorted character. As long as no change takes place in the symmetry of the magnetic field the firing mechanism remains inert regardless of any impact to which the device might be subjected by any contiguous non-ferromagnetic object.

Therefore it will be understood that from the standpoint of physical contact the instant firing mechanism has the advantage over other mechanical firing devices of distinguishing, in a manner of speaking, between contact with an iron body such as a submarine vessel, mobile tank, engine or the like, and contact with the sea or sea bottom, fish body, earth surface, or the non-ferromagnetic outrigger portions of aircraft. By the same token the firing mechanism has an advantage over other electrical contact devices in that an insulating sheathing paint or electrical potentials emanating from the ship or vehicle are normally ineffectual against preventing its functioning under the conditions of actual contact or passage in close proximity.

Considered from its fundamental aspect the firing mechanism is based on the establishment of a magnetic field and the placing of a magnetically operated switch, herein conveniently termed a relay, to connect zones of low-potential difference thereof, said relay remaining inactive only so long as said field remains undisturbed. The disturbance of said field causes a portion thereof to be shunted through the relay which thereupon closes, in turn closing a connected electrical detonator circuit.

An important auxiliary use of the invention is that of activating a diminutive exploratory bomb for locating submarine, ferromagnetic masses. A plurality of magnetic bombs of this type may be dropped overboard and, consequently, sunk preferably according to a pre-arranged pattern. Said pattern will be shaped according to the judgment of the officer in charge and will be executed in the region of suspected location of the target-mass. Any of the diminutive magnetic bombs affected by the target-mass will produce an explosion which can be heard through a listening device and thus betray the location of the submerged target. Another important use of the invention is that of firing a depth charge for the purpose of destroying a submerged body. A relatively heavy depth charge which may be equipped with the instant magnetic firing mechanism, will then be dropped over the source of said sound. The impact of the depth charge with the ferromagnetic target, or its passage in close proximity to the target, will result in a destructive explosion.

From this preamble the objects of the invention will be understood to consist of providing a relay mechanism which responds only to either direct contact with a body of ferromagnetic material or the passage of said body in such close proximity that it may influence the relay mechanism in the manner brought out above.

Another object of the invention is to provide an explosive bomb having embodied in it in a suitable manner a firing mechanism which will set off said bomb only in the event of the bomb striking a ferromagnetic mass or coming into very close proximity thereto.

A further object of the invention, and one based directly on the statement immediately preceding, is to provide a bomb, torpedo, depth charge or the like, having a magnetic firing mechanism which will operate upon coming very close to or making actual contact with a target of iron or similar ferromagnetic material.

A further object of the invention is to provide an exploratory method of locating "dead still" submarine vessels, the performance of the method requiring the use of a number of diminutive type magnetic bombs, adapted to be dropped in the supposed location of the submarine vessel, the sound of the explosion of at least one of the bombs serving to indicate the position for dropping a large-size depth charge.

A still further object of the invention is to provide a magnetic firing mechanism for any of the prevailing types of bombs, projectiles, torpedoes, mines, and similar ordnance devices which is of the utmost simplicity and therefore capable of manufacture and installation in the bomb, etc. without a material increase in cost.

A further object of the invention is to provide a magnetic firing mechanism which shall not depend upon the relative motion of the ship and mechanism, and with sufficient range to be difficult to protect against by an inert sheath around the submarine.

Other objects and advantages will appear in the following specification, reference being had to the accompanying drawings in which:

Fig. 1 is a sectional perspective view of a marine depth charge, illustrating the application of one type of magnetic firing mechanism;

Fig. 2 is a diagrammatic view of the magnetic switch, illustrating a theoretical symmetrical distribution of the lines of force as in the normal, undisturbed status of the magnetic field;

Fig. 3 is a diagrammatic view of the magnetic switch, illustrating the distortion of the magnetic field in the presence of a ferro-magnetic body and the consequent operation of the relay;

Fig. 4 is a sectional perspective view of the magnetic switch shown in Fig. 1, illustrating the structure more in detail;

Fig. 5 is a cross-section taken on the line 5—5 of Fig. 4;

Fig. 6 is a perspective view of a modified form of magnetic switch, parts being shown in section;

Fig. 7 is a central longitudinal section of a modification both in the type of depth charge and in the type of magnetic firing mechanism embodied therein;

Fig. 11 is a perspective view of the secondary electrical switch;

Fig. 12 is a diagram of the electrical circuit; and,

Fig. 13 is an electrical diagram of a further modification of the invention.

Figure 8:
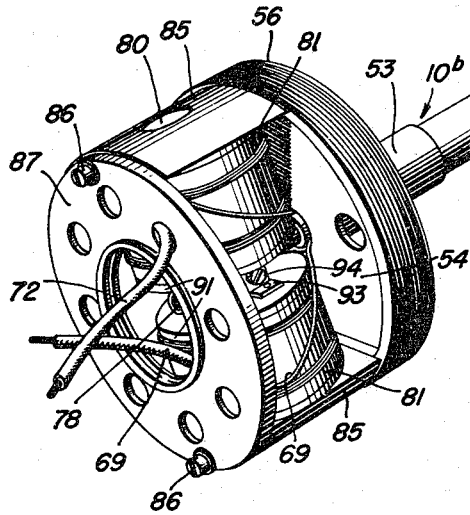
Fig. 8 is a perspective view of the foregoing magnetic firing mechanism.

The magnetic firing mechanism, generally designated 10, in Fig. 1 has for its specialized use in this disclosure the setting off or firing of a volume of explosive 11 such as is embodied in the non-ferrous container 12 of a marine depth charge. At this point it is desired to repeat the explanation that the use of the mechanism 10 is not necessarily limited to a marine depth charge. Said mechanism may be used for the firing of other types of explosive devices, such as projectiles, mines, torpedoes, and similar ordnance devices, but they will be referred to herein as bombs. It will also be remembered that the broadest aspect of the invention is that it may be used as an electrical switch without regard to the nature of the contrivance which is intended to be controlled thereby.

In the first form of the invention appearing in Figs. 1 to 5 the firing mechanism comprises the magnetic switch 13, an electrical battery 14, a detonator 15, and a booster 16, said detonator and booster broadly constituting a primer. The battery 14, which preferably comprises two or more dry cells, but which may comprise any source of electric current such as a battery activated by contact with sea water as later described, is connected in series with the magnetic switch 13 and the detonator 15 by wires 17 and 18. These wires respectively are affixed to the terminals 19, 20 of the contact element or so-called relay 21. Said relay actually is a primary switch, and it consists of a vessel or capsule 22 of the type disclosed in Patent No. 2,289,830 of Walter B. Ellwood, issued July 14, 1942, for Circuit closing device.

In preparing the relay 21 the capsule 22 is evacuated and then filled with a suitable atmosphere to preserve the cleanness of the contacts 23, 24. Said contacts are composed of two flexible reeds of magnetic material which have their remote ends sealed in the extremities of the glass capsule. Their adjacent ends are in overlapping relationship to each other and are normally separated by a small gap. The application of magneto-motive force to the relay 21 along its longitudinal axis causes the reeds to become magnetized. The resulting mutual attraction causes the engagement of the free ends of the reeds, thereby closing an electrical circuit.

The ends of the relay 21 occupy recesses 25 in the confronting ends of an axially aligned pair of ferromagnetic rods 26, 27, where they are held immovable by plugs 28 of wax or equivalent inert material. The far ends of the rods 26, 27 are set in centrally located depressions 29 in a pair of relatively large, round discs 30, 31, where they are secured by spot welds 32 or an equivalent fastening. In practice the discs and rods may be mutually attached by any other suitable connection.

Said discs are composed of some suitable permanent magnet material, preferably of high energy product such as that alloy known to the trade as "Alnico." The discs 30, 31 are magnetized diametrically and thereby set up a normally symmetrical magnetic field 33 when supported in the relationship shown in Figs. 1, 2 and 4. Said relationship is established by brackets 34 which may be riveted or otherwise attached to the discs at holes 35 (Fig. 4), and extend out to the container 12, to which they are suitably attached, as at 36.

The brackets preferably are of equal lengths and symmetrically distributed, thereby to centralize the magnetic switch 13 on the axis of the depth charge. The wires 17, 18 emerge from the switch 13 at a space 37 between the previously mentioned confronting ends of the iron rods 26, 27. This space is not as necessary for the purpose of accommodating the wires 17, 18 as it is to insure the closure of the relay 21 when a portion of the magnetic field 33 passes therethrough.

Normally said field maintains the symmetrical form suggested by the arrows in Fig. 2 disposed about a magnetic axis 40. The rods 26, 27 and the relay 21 normally are in substantial coincidence with the magnetic axis and therefore occupy a zone 38 in which the magnetic potential difference is substantially zero. The relay 21 therefore is normally bridged by the magnetic field 33, and remains inoperative in its magnetically neutral mid-zone. It is the upsetting of the balance of said bridge that causes the relay to operate.

The ferromagnetic body 39 (Fig. 3) may be regarded as a portion of the side of a submarine vessel or other target-mass. The bomb in which the magnetic switch 13 is supposed to be embodied shall either strike the body 39 or approach it in close proximity. The latter condition is depicted in Fig. 3. Inasmuch as the permeability of the ferromagnetic body 39 is far greater than that of air, it follows that some of the lines of force of the magnetic field nearest the body in that side of the magnetic field nearest the body 39 will follow the latter because of its offering a path of less reluctance.

As the result of the distortion of that portion of the magnetic field contiguous to the body 39 there is a bodily shifting of the total magnetic field from its normally symmetrical status as in Fig. 2 to a status wherein the magnetic axis 40 lies to one side of the ferromagnetic core. For the purpose of the description immediately following, the magnetic field 33 may aptly be distinguished by its left and right portions 41, 42. The effect of the presence of the ferromagnetic body 39 in the magnetic field is to increase the number of lines of force in each field portion, thereby making the magnetic field slightly more dense. In Fig. 3 the foregoing distortion of the magnetic field consists of an inward displacement of the left field portion 41 toward the iron core because of the outward displacement of the right portion 42 toward the body 39.

The resulting redistribution of the flux will divert some of the excess lines of force represented by the single line 43, which otherwise would be confined to the left field 41, to passage through the core 26, 27 and the contacts 23, 24. Thereupon magnetic poles of opposite signs are established at the free ends of the contacts, causing their attraction as shown in Fig. 3. The consequent engagement of said contacts simultaneously closes the electrical circuit. This fires the detonator 15, booster 16, and the main charge 11.

Fig. 6, although modified in form, operates on the same principle just described. This is a type according to which a single ferromagnetic rod is intended to function as a magnetic flux collector. In other words, the single rod 44 can serve as the return path for the magnetic circuit if and when the normal field 45 becomes distorted substantially in the manner brought out above. Although the twin central rods in each of Figs. 1 to 4 serve the same purpose as does the single rod 44, yet in the first form it is supplemented by a second magnetized disc which, because of that addition, renders the first form of the device more sensitive than the second. But in Figs. 1 to 4 it is possible to substitute one of the permanently magnetized discs with a disc merely of magnetizable material. As later explained, such a disc would be magnetized only when the occasion for use of the device arose.

Reverting to Fig. 6, the rod 44 is affixed in the center of a non-magnetic disc 46 which comprises its support. Said disc is intended to be secured within the body of an aerial or submarine bomb, projectile, torpedo, mine, depth charge, or the like, to which use the type of firing mechanism in Fig. 6 is especially adapted. A magnetized disc 47 or rod, which again is preferably composed of some highly retentive material such as "Alnico," is also secured in the bomb in the relationship shown. A recess 48 in the anchored end of the rod 44 houses one end of the magnet relay 21, a plug of wax 49 or the like being used to hold the relay in place. A central hole 50 in the disc 47 lets the other end of the relay through, thus constituting an arrangement from which a desirable conservation of space is derived.

It is possible to adjust the sensitivity of each type of firing mechanism. Such an adjustment would consist of regulating the distance between the discs 30, 31 in Figs. 1 to 4, and in Fig. 6 it would comprise changing the relationship of the disc 47 and rod 44 along the common axial distance. The results of either adjustment are to attenuate or condense the magnetic flux. Consequently said flux is rendered more or less liable to distortion by a proximate ferromagnetic body.

The magnetic field 45 normally remains uniform or symmetrical as before, but when said field is distorted on either side adjacent to the poles by a diversion of the lines of force, the resulting asymmetry of the field will cause magnetic flux to flow along the ferromagnetic rod 44. Since said rod is thereupon embraced in the magnetic circuit the latter is provided with a direct path to the contact reeds 23, 24 in a sufficiently large volume to cause the magnetization and consequent attraction of said reeds. A detonator circuit may then be closed as before.

Figure 9:
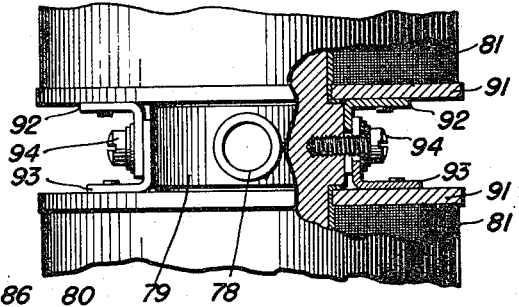
Fig. 9 is a partially sectional and elevational view of a portion of the electromagnet in Fig. 8.
Figure 10:
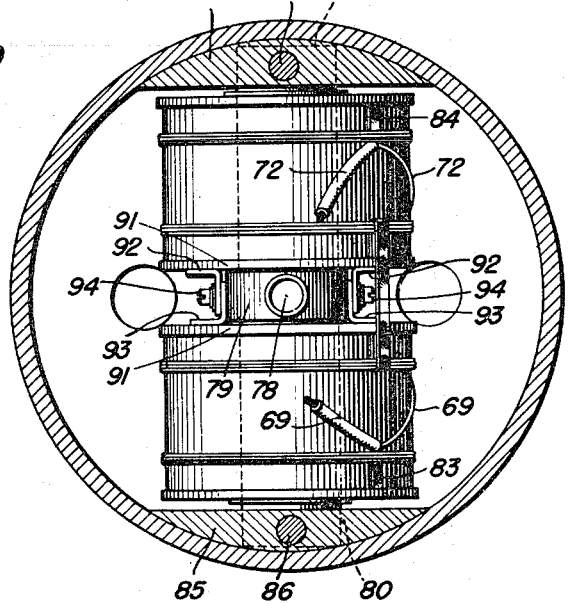
Fig. 10 is a cross-section taken on the line 10—10 of Fig. 7.

Figures 7 to 12 illustrate another modification wherein the magnetic field is derived from an electromagnetic source instead of from a permanent magnet structure. This modification may have certain practical advantages in handling, since the electromagnet is dormant except when wanted and is less susceptible to damage by rough handling. The general arrangement of this modification is well shown in Figure 7 wherein parts similar to those in Figures 1 to 5 are designated by corresponding numerals, distinguished, however, by the exponent letter b.

The magnetic firing mechanism 10b is housed by a tube 51 which occupies an axial position in the container 12b. The inner end of the tube (not shown) is closed. The outer and forward end of it is welded to a plate 52 which, in turn, is welded to the inside of the container 12b, thus to complete the forward end of the compartment for the explosive 11b. A sleeve 53, which projects from a nonferrous head 54, occupies an enlarged portion of the tube 51. This sleeve has an attached ferromagnetic tube 55 which extends into and occupies the tube 51 when the externally threaded rim 56 is screwed into the end of the container 12b. A portion of said rim is screwed into a cap 57 which houses the magnet assemblage as shown.

Said firing mechanism 10b may thus be understood to be a unit (Fig. 8) which is adapted to be mounted in place in the container 12b after having been charged with its explosive, the assemblage being completed by screwing the exposed threads of the rim 56 into 12b. The mechanism is mounted in the cap 57 with potting wax to support the elements against impact. The firing mechanism may include the booster 16b which is fitted tightly in the tube 55 and constitutes its inner terminal. Said booster has an initially vacant bore 58. This bore is eventually occupied by the adjacently located detonator 15b upon the exercise of water pressure upon a movable assemblage which carries the detonator. In the absence of water pressure the detonator is separated a safe distance from the booster, i. e., the unarmed position.

The arming assemblage consists of a piston 60 which makes close, slidable contact with the inner wall of the tube 55, which contains the piston, through a cup leather 61. The purpose of the cup leather is to receive the impact of the water column when admitted to the interior of the tubing. A ferrule 62 extends inwardly of the tubing from a projection from the piston on which said ferrule is fixed, the reduced free end 63 of the latter tightly holding the butt of the detonator 15b.

The detonator provides the convenient mount for a secondary electrical switch 64 (Figure 11) which functions as an arming device for the detonator circuit. Said switch consists of a spool 65 of insulation which may or may not have an adapter sleeve in it, as shown in Figure 7. Each of a pair of contacts 66, 67 has a wire connected to it, the respective wires 68, 69 being connected to a terminal of the detonator in the first instance and one pole of a battery 70 in the second instance. A wire 71 from the other terminal of the detonator is connected with one terminal of the magnetic relay 21b, the remaining terminal of which is connected by a wire 72 with the other pole of the battery.

As seen in Figure 7, the switch 64 faces the forward end of the booster 16b. Said end thus provides the abutment against which the contacts 66, 67 on the face of the spool 65 are pressed by the inward movement of the piston 60 for the closure of the detonator circuit at one point. The other point of closure of said circuit lies within the relay 21b, but the closure does not occur here until the explosive charge comes into proximity with a ferromagnetic body as described above.

A spring 73 between the booster 16b and the piston 60 presses the latter forwardly and keeps the detonator 15b clear of the bore 58, as seen in Figure 7. A shoulder 74 near the forward end of the piston then engages the inner end of a ferrous cylinder 75 which is fixedly held in the sleeve 53. Said cylinder has a short tube 76 which is positioned centrally of a perforated web 77. One end of the relay 21b is housed by said tube, the other end of the relay being housed by the inner extremity of a longer central ferrous tube 78. This tube has its anchorage in the enlarged center 79 of the core 80 of an electromagnet 81.

The tubes 76, 78 thus shield the relay, which is of a delicate construction, the enclosure of the relay being completed by a sleeve 82 mounted upon the contiguous tube ends. The leads 83, 84 from the electromagnet are joined to the wires 69, 72, thereby being shunted across the battery 70. The latter is initially dormant, not being energized until seawater is admitted. Thereupon it becomes energized by the electrolytic action of the sea-water upon the elements of the battery. Other than making this brief statement of the nature of the battery, it is deemed unnecessary to describe its structural details.

Pole pieces 85 are mounted upon the extremities of the cores 80 in such locations that a snug fit of their outer faces is had with the cap 57 in which the electromagnet is located. Cap screws 86 secure the pole pieces 85 to the core 80 and at the same time clamp them tightly between the rim 56 of the head 54 and a retaining ring 87. As seen in Figure 7, the cap screws go through holes in the retaining ring, pole pieces, and cores before being driven into tapped holes in the rim 56. A weight 88, pocketed and secured in the forward end of the cap 57, may be used to add to the hydrodynamic stability of the device. This weight has a central bore in communication with a hole in the cap and with the tube 78, the removal of the closure 89 making ready for dropping said device into the water. When thus admitted, the water activates the battery 70 and flows through a short section of tubing 90 to the central tube 78.

Thence it escapes through openings and reaches the piston 60. The inward pressure moves the piston against the tension of the spring 73 until the electrical switch 64 abuts the booster 16b. By this time current from the now-activated battery 70 will energize the electromagnet 80, 81 setting up a magnetic field much on the order of the field in Fig. 6. This field remains symmetrical as long as the device stays clear of a ferromagnetic body, thereby avoiding closing the relay 21b. However, the detonator 15b has taken up its position in the bore 58 of the booster 16b, and its switch 64 has been closed, as already pointed out.

When the magnetic field is distorted by proximity to a ferromagnetic body in the manner previously described, some of the lines of force traverse the inner portion of the tube 78 as well as the contacts 23b, 24b of the relay 21b. The detonator circuit is now closed and the detonator 15b is exploded.

The coils 81 of the electromagnet are desirably secured at the center of the coil assemblage to avoid any possibility of their shifting on the core 80. For this purpose each of the confronting heads 91 (Fig. 9) has a pair of cleats 92, 93 riveted to it in such positions that they will lap each other when fitted together and stand close to the enlargement 79. Machine screws 94 driven into the enlargement through matching slots in the free ends of the cleats hold the electromagnets tightly.

Fig. 13 is a diagrammatic illustration of a still further modification wherein the velocity of approach of the projectile embodying the invention, to a magnetic body and the resulting development of an induced current in an appropriately sensitive part of the invention, is responsible for the closure of the detonator circuit, rather than the distortion of an existent magnetic field. This last modification thus is more sensitive than the preceding forms, which latter is limited by the sensitivity of the relay so that it is suitable only for distances comparable to the dimensions of the magnets.

In Fig. 13 the ferromagnetic rod 95 is the equivalent of any of the ferromagnetic rods 26, 27, 44 (Figs. 4 and 6) as is also the magnetized disc 96. The relationship of rod and disc is the same as in Fig. 4, but instead of using the rod as a mount for the relay it becomes a core upon which a coil 97 is wound as, for example, in Fig. 7. The substitution of the coil for the relay makes the device in Fig. 13 insensitive to static changes in the magnetic potential produced by neighboring magnetic bodies, but depends upon the time rate of change of the magnetic flux from the core.

This feature is desirable when the modification is embodied in rapid projectiles having a high velocity of approach to their target. When the direction of approach is at an angle with respect to the target the effect on the magnetic field is the same as in each of the other forms, namely a distortion thereof from its initial symmetrical contour. The result then depends upon the time rate of change of the magnetic flux from the core 95, and as a current is induced in the coil 97 there will be a current flow in the low potential circuit of the electrically coupled amplifier 98.

The output of said amplifier comprises a coil 99 which is in operative relationship to the relay 21c. This relay is identical with the relay in any of the preceding forms. The terminals of its reeds 23c, 24c are connected with an electrical circuit 100 which embraces the detonator 15c and a battery 101. The magnetized disc 96 and its carried parts are installed in the explosive device, for example the nose of a projectile, whence the control of the detonator is effected.

As the projectile approaches the target in the manner mentioned above, which, for the purpose of exemplifying the invention, is regarded as being composed of magnetic material, the rapid disturbance of the magnetic field surrounding the disc 96 with respect to the coil 97 sets up the foregoing induced current. This current is amplified to a sufficiently large volume in the coil 99 to produce a field sufficiently strong to magnetize the reeds 23c, 24c. The resulting attraction of said reeds and closure of the circuit 100 will explode the detonator 15c and so a heavier explosive charge around it.

Inasmuch as battleships, submarine vessels, guns, mobile tanks, airplane and automobile engines, as well as similar kinds of equipment used in warfare, are made of iron, steel and/or other ferromagnetic materials, it will readily be understood that any one of said targets will be vulnerable to the instant bomb if the latter actually strikes, approaches or passes so closely as to divert the magnetic field as explained. In order that the casing of the bomb shall not shield or short-circuit the magnetic field, or, possibly, function as the trigger for the bomb, it is necessary to make said casing of non-ferromagnetic material.

It was pointed out in the beginning that the use of the magnetic switch is not necessarily confined as an arming device for an explosive charge. Said use may be extended to any field wherein it is proposed to make either the direct contact of the instrumentality embodying the switch, or close proximity of said instrumentality to a ferromagnetic body, the circumstance under which an associated electrical circuit shall be closed as the result of the distortion or readjustment of the internal magnetic circuit and the concomitant closure of a magnetic relay.

While the invention has been described with reference to certain preferred examples thereof which give satisfactory results, it will be understood by those skilled in the art to which the invention pertains that various changes and modifications may be made without departing from the spirit of the invention or the scope of the claims.

The invention herein described may be manufactured and used by or for the Government of the United States of America for governmental purposes without the payment of any royalties thereon or therefor.

I claim:

1. The method of locating and destroying a submerged ferromagnetic mass, which consists in sinking a plurality of bombs of diminutive size in the region of suspected location of said mass, each of said bombs being adapted to be exploded by a change in the local magnetic field thereof as the bomb moves into proximity to said mass, detecting the source of the sound of the explosion of any of said bombs, and subsequently sinking over the source of said sound a relatively heavy depth charge adapted to be fired by a change in the local magnetic field thereof as the depth charge moves into proximity to said mass.

2. The exploratory method of locating a submerged ferromagnetic mass which comprises the sinking of magnetically controlled bombs of diminutive size over an area suspected to contain said mass, and listening for the sound of the explosion of at least one of said bombs fired by proximity to said mass.

3. The method of locating and destroying a submerged ferromagnetic mass which comprises the sinking of bombs of diminutive size in a prearranged pattern over an area suspected to contain said mass, each of said bombs being adapted to be exploded by a change in the local magnetic field thereof as the bomb moves into proximity to said mass, detecting the source of the sound of the explosion of at least one of said bombs, and subsequently sinking over the source of said sound at least one relatively heavy magnetically controlled detonatable depth charge adapted to be fired by a change in the local magnetic field thereof as the depth charge moves into proximity to said mass.

4. In a depth charge, a firing control device of the character disclosed comprising, in combination, a pair of mutually engageable flexible contacts composed of magnetic material, and means within the device for setting up a magnetic field which invariably extends a substantial distance beyond the structural limits of the depth charge and includes a low magnetic potential zone normally located at said contacts and adapted to be shifted away from the contacts as the depth charge moves into the vicinity of a target-mass of magnetic material, said contacts being engaged upon magnetization thereof by the field as said potential zone is shifted.

5. In a depth charge, the combination of a pair of flexible ferromagnetic conductors adapted to be mutually engaged upon magnetization thereof, ferromagnetic means adapted to set up a magnetic field which invariably extends a substantial distance beyond the structural limits of the depth charge and includes a low magnetic potential zone normally located at said conductors and adapted to be shifted away from the conductors as the depth charge moves into the vicinity of a target-mass of magnetic material, and a firing circuit including the conductors and adapted to be closed thereby upon magnetization thereof by the field as said potential zone is shifted.

6. In a depth charge firing mechanism for closing an electrical firing circuit to an explosive device, the combination of a ferromagnetic element, ferromagnetic means arranged in predetermined spaced relation to said element, a nonmagnetic vessel arranged intermediate the element and said means, said means comprising the source of a magnetic field which invariably extends a substantial distance beyond the structural limits of the depth charge and includes a low magnetic potential zone normally located at said vessel and adapted to be shifted away from the vessel in response to movement of the depth charge into the vicinity of a target-mass of magnetic material, and means mounted in said vessel for closing said circuit and comprising a pair of normally open flexible ferromagnetic members adapted to be closed upon magnetization thereof by the field as said potential zone is shifted.

WALTER B. ELLWOOD.

REFERENCES CITED

The following references are of record in the file of this patent:

UNITED STATES PATENTS

| Number | Name | Date |
|---|---|---|
| 571,739 | Badt | Nov. 24, 1896 |
| 1,379,972 | Fiske | May 31, 1921 |
| 1,466,915 | Nichols | Sept. 4, 1923 |
| 1,698,857 | Schmidt et al. | Jan. 15, 1929 |
| 2,289,830 | Ellwood | July 14, 1942 |
| 2,322,851 | Kalb | June 29, 1943 |

FOREIGN PATENTS

| Number | Country | Date |
|---|---|---|
| 803,907 | France | July 20, 1936 |